United States Patent [19]

Guzman

[11] 4,184,762
[45] Jan. 22, 1980

[54] VARIABLE DEFINITION PROJECTION SYSTEMS

[76] Inventor: Oscar Guzman, 12 St. Dennis Dr., Apt. 228, Don Mills, Ontario, Canada, M3C 1E9

[21] Appl. No.: 916,159

[22] Filed: Jun. 16, 1978

[51] Int. Cl.² ............... G03B 13/24; G03B 13/36; G03B 21/60
[52] U.S. Cl. .................. 355/1; 350/117; 350/126; 350/128; 355/44
[58] Field of Search ............ 355/1, 40, 44; 350/117, 350/127, 126, 128

[56] References Cited

U.S. PATENT DOCUMENTS

| | | | |
|---|---|---|---|
| 3,191,495 | 6/1965 | Miller | 350/128 |
| 4,045,133 | 8/1977 | Carlson | 355/1 |
| 4,053,208 | 10/1977 | Kato et al. | 350/117 |
| 4,057,338 | 11/1977 | Yevick | 355/1 |
| 4,066,332 | 1/1978 | Kato et al. | 350/126 |
| 4,083,626 | 4/1978 | Miyahara et al. | 350/117 |

*Primary Examiner*—Richard A. Wintercorn
*Attorney, Agent, or Firm*—Fetherstonhaugh & Co.

[57] ABSTRACT

A rear projection screen and a method of using the screen in imaging systems is provided in which the screen provides discrete areas which are isolated from one another whereby the light of one discrete area cannot be transmitted to another discrete area, each discrete area being filled with a filler material which diffuses the light passing therethrough so that at the viewing face of the screen each discrete area has a uniform light intensity across its width while neighboring discrete area may have sharply contrasting light intensities.

19 Claims, 10 Drawing Figures

VARIABLE DEFINITION PROJECTION SYSTEMS

FIELD OF INVENTION

This invention relates to rear projection screens and methods of using same in imaging systems.

PRIOR ART

A system for producing images in which the light intensity is substantially uniform across discrete areas of the image while permitting a contrast in light intensity between discrete areas has been developed by Leon D. Harmon. This system is described in detail in Scientific American, November 1973, published by Scientific American Inc., New York, N.Y. This system is controlled by a computer. To create the image the computer divides the picture into a plurality of squares of uniform size and averages the brightness value of all the points within each square. This information is then used to generate an image. This process for producing "block" portraits is expensive and requires expensive equipment in the form of a programmed computer. Further improvements in this system have been developed by Edward Manning and a brief description of such improvements is contained in a publication entitled "Artist and Computer" produced by Creative Computing Press, published by Harmony Books, first printed June 1976. This article describes the pictures as being produced using the system identified by the trade mark "BLOCPIX" owned by Watson Manning, Inc. Again, this article appears to be describing a system for producing pictures which uses a computer. In this respect, the article refers to the fact that the total number of units into which the picture may be divided is limited to 1500 because of limitations in the computer.

SUMMARY OF INVENTION

The present invention provides for the production of images comparable to those produced by Harmon or Manning without the aid of a computer.

It is an object of the present invention to provide a simple and inexpensive method of producing images with the aid of a rear projection screen which is capable of isolating discrete areas thereof from one another whereby the light from one discrete area cannot be transmitted to another discrete area as it is transmitted through the screen and in which the light is diffused as it is transmitted through each area to a substantially uniform intensity across the width of each discrete area when viewed from the viewing face of the screen.

According to one aspect of the present invention, there is provided a screen for use in a rear projection system which comprises, a screen body having a projection face and a viewing face, a plurality of passages opening through said body for transmitting light from said projection face to said viewing face, said passages having opaque side walls for preventing light transmission from one passage to another through said side walls, a body of substantially homogeneous translucent filler material in each of said passages, said filler material serving to uniformly disperse light transmitted therethrough such that light directed into each passage at the projection face of the screen and having a variable intensity across the width of each passage will be visible at the viewing face of each passage having uniform light intensity, and wherein by reason of the opaque side walls sharp contrast in light intensity between adjacent passages may be visible at said viewing face.

According to a further aspect of the present invention, there is provided a screen as described in the preceding paragraph wherein the translucent filler material is in the form of paraffin wax.

According to yet another aspect of the present invention, there is provided an imaging system which comprises a rear projection screen having a projection face and a viewing face, opaque divider means extending across the screen dividing it into a plurality of isolated light transmitting passages extending between the projection face and the viewing face, a body of translucent material in said passages for integrating the light passing therethrough from the projection face to the viewing face so as to provide uniform light intensity across the width of individual passages at said viewing face, projector means adapted to project a progressively varying image onto said projection face so as to progressively vary the resolution of the image viewed at the viewing face of the screen.

According to a still further aspect of the present invention, there is provided a method of forming an image on a rear projection screen having a projection face and a viewing face which comprises the steps of projecting a light image onto said projection face, isolating discrete areas of the projected image whereby light from one discrete area cannot be transmitted to another discrete area as the light therein passes through the screen, diffusing the light in each said discrete area as it passes therethrough such that the light intensity of each individual discrete area is uniform across its width when viewed from the viewing face while the light intensity adjacent discrete areas may differ substantially.

According to yet another aspect of the present invention, there is provided a method of preparing a series of photographic images of varying resolution comprising the steps of projecting an image onto a projection face of a rear projection screen and progressively varying the size of the projected image on the screen, isolating discrete areas of the screen from one another, whereby light from one discrete area cannot be transmitted to another discrete area through the body of the screen as it is transmitted through the screen to the viewing surface, diffusing the light in each discrete area through which the image is transmitted to the viewing face such that the light intensity of each discrete area is uniform across its width when viewed from said viewing face while the light intensity of adjacent discrete areas may differ substantially, photographing images appearing on the viewing face of the screen.

PREFERRED EMBODIMENTS

The invention will be more clearly understood after reference to the following detailed specification read in conjunction with the drawings wherein, FIG. 1 is a side view of an imaging system according to one aspect of the present invention;

Figure 1:
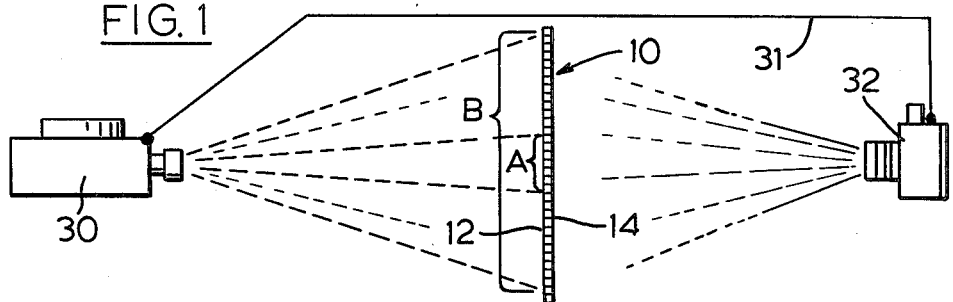
Figure 2:
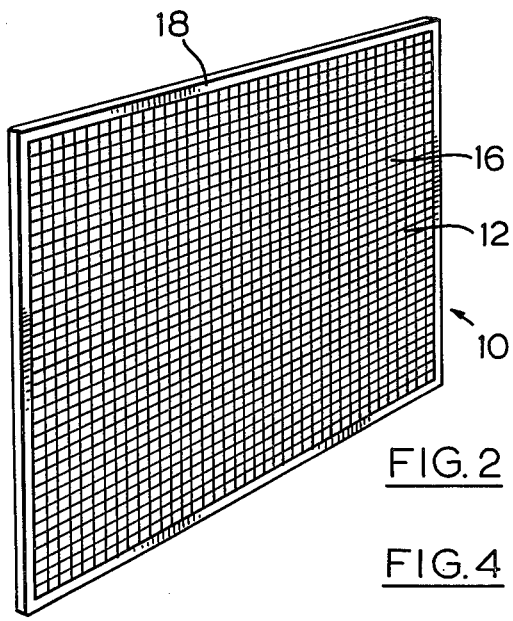
FIG. 2 is a pictorial view of a rear projection screen according to an embodiment of the present invention.

With reference to FIG. 2 of the drawings, the reference numeral 10 refers generally to a rear projection screen constructed in accordance with an embodiment of the present invention. The screen 10 has a projection face 12 and a viewing face 14 (FIG. 1). The screen 10 consists of a screen body 16 which is bounded by a frame 18, each leg of which is in the form of a U-shaped member. The screen body 16 consists of a plurality of ribs 20 which extend parallel to one another and a plurality of ribs 22 which extend parallel to one another and intersect and are nested with the ribs 20 at right angles to one another so as to form a plurality of passages 24 extending through the body of the screen between the projection face 12 and the viewing face 14. The ribs 20 and 22 are made from an opaque material so that light cannot be transmitted therethrough with the result that the passages 24 are isolated from one another. Consequently, the light which is directed into each passage 24 may pass therethrough but the light in one passage 24 cannot be transmitted through the body of the screen to any of the other passages 24. Thus, the ribs 20 and 22 serve to isolate discrete areas of the screen from one another.

Figure 3:
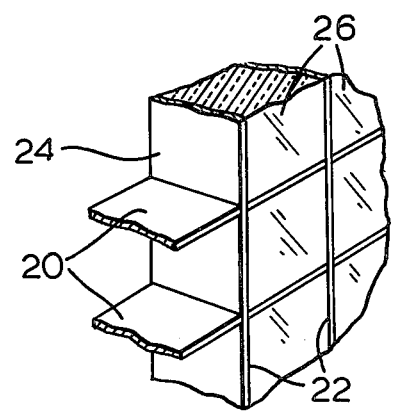
FIG. 3 is an enlarged detailed view of a portion of the screen in FIG. 2.

As shown in FIG. 3 of the drawings, a body or block 26 of substantially homogeneous translucent filler material is located in each passage 24. The object of the body or block 26 of translucent filler material is to diffuse the light which passes therethrough so that the intensity of the light when viewed at the viewing face of the screen is substantially uniform across the width of each individual passage. While any number of substantially homogeneous translucent filler materials may serve this purpose, I have found that paraffin wax is particularly suitable for use in the manufacture of a screen in that it provides excellent light diffusion and it is an inexpensive material which can be readily and inexpensively located within the adjacent passages of the screen. When the filler is made from paraffin wax, in order to obtain a high degree of uniformity of light intensity across the width of each block, when viewed at the viewing face, the thickness of each block of wax in each compartment is at least 1.25 and preferably at least 1.5 times the maximum width of the passage in which it is located. When filler materials other than paraffix wax are used, the optimum thickness of each block can be easily determined by simple observation tests. An alternative filler material is polyester resin or an acrylic plastics material.

The ribs 20 and 22 of the screen are preferably made from a lightweight metal such as aluminum or a plastics material. The ribs 20 and 22 are preferably of a relatively thin cross-sectional area so as to minimize the proportion of the screen which will not transmit light from the projection face to the viewing face. In addition, the inner faces of each of the ribs 20 and 22 are preferably coated with a light reflecting material so that light is not absorbed around the peripheral edges of the passages 24 thus preventing the formation of sharp shadows around the edges of each discrete area. The coating applied to the inner faces of the ribs 20 and 22 may be in the form of white paint or a mirroring material.

FIG. 1 of the drawings illustrates an imaging system in which a projector 30 projects images onto the projection face 12 of a screen 10 and a camera 32 photographs the images appearing on the viewing face 14 of the screen 10. The projector 30 and camera 32 are suitably interconnected by a connection diagrammatically represented by the reference numeral 31 so that the operation of the projector and camera may be synchronized. The projector 30 may be a moving picture projector or a slide projector and the camera 32 may be a still camera or a movie camera, depending upon the nature of the images required. It will also be apparent that for direct viewing, the system may be used without a camera 32.

In use, in order to obtain different resolutions of the image view on the viewing face of the screen 10, the projector 30 may initially project an image onto a small portion A of the screen 10 and then progressively increase the proportions of the area of the screen onto which the image is projected until substantially the entire area B of the projection face of the screen is filled with the image. When the entire projected image is applied to the small area A of the screen, it extends over only a small number of passages 24 of the screen. Thus, the projected image is divided into a small number of discrete areas with the light intensity of each area being diffused by a passage through the body of translucent material so as to be viewed as an area of uniform light intensity at the viewing face. Thus, the resolution of the image at the viewing face extending over the area A is minimal and will progressively increase as the area of the projected image increases from the area A to the area B by reason of the fact that the number of discrete areas to which the image is subdivided by the screen is also progressively increased.

A series of photographs may be taken by the camera 32 of the images appearing on the viewing face 14 of the screen so as to provide a record of the progressively increasing resolution or progressively decreasing resolution of the image appearing on the screen as required. Preferably the camera 32 is focused on the area filled by each image so that the entire frame of the film in the camera 32 is filled by the image so that the proportions of the photographed image may remain constant while the degree of resolution of the image varies according to the image appearing on the viewing face of the screen.

By photographing a series of images of progressively increasing or progressively decreasing resolution as described above, one may produce a film which is animated in the sense that the progressive steps on the variation in resolution may be shown as a motion picture. For example, the image provided by the film prepared as described above and subsequently projected onto a screen may initially appear to be of a homogeneous nature and the final image may be shown to grow in resolution through progressively increasing steps of resolution until ultimately a clearly discernable image is provided. The rate at which the resolution of the projected image varies may be controlled to follow any required mathematical formula. This system may be particularly suitable when used in attempting to measure an individual's ability to perceive the formation of visual images.

In the embodiment illustrated in FIG. 1 of the drawings, the projector 30 is preferably a zoom projector so that the size of the projected image appearing on the screen can be varied. The size of the projected image appearing on the screen may also be varied by moving the projector towards and away from the screen. A suitable apparatus may be provided for driving the projector towards and away from the screen. Similarly, the camera may be moved towards and away from the screen to accommodate the variations in the size of the image which is viewed on the screen. In a further variation, two separate slide projectors may be used to project a progressively varying size image onto the screen.

Figure 4:
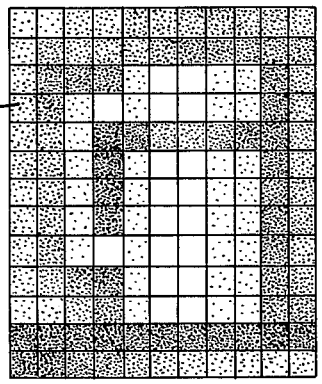
FIG. 4 is a view illustrating the image appearing on the viewing face of the screen in use.

FIG. 4 of the drawings illustrates an image appearing on a selected area of a screen as viewed from the viewing face 14 of the screen. It will be apparent from FIG. 4 that while the light intensity is uniform within each individual area 24a, the light intensity of adjacent areas 24a varies substantially. It will be apparent that the greater the number of areas onto which the image is projected, the greater the degree of resolution of the image which will be available at the viewing face.

It will be apparent that the screen and imaging system of the present invention are inexpensive to manufacture and simple to use.

Various modifications of the present invention will be apparent to those skilled in the art.

Figure 6:
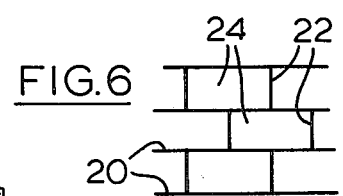
FIGS. 6, 7 and 8 are plan views of screen dividers in which the isolated discrete areas are of different configuration.
Figure 7:
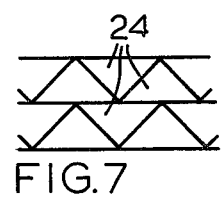
Figure 8:
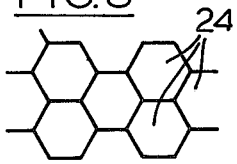

FIGS. 6, 7 and 8 of the drawings serve to illustrate modifications of the structure of the screen. In FIG. 6 of the drawings, the passages which are formed by the ribs 20 and 22 are rectangular in shape. In FIG. 7 of the drawings, the passages 24 are triangular in shape and in FIG. 8 of the drawings, the passages 24 are hexagonal in shape. Clearly the pattern of the image provided by varying the configuration of the passages 24 will vary. However, the light intensity within each passage will remain uniform.

Figure 9:
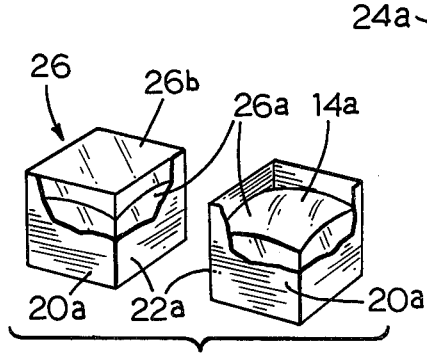
FIG. 9 is a pictorial view of a group of light transmitting blocks for use in a screen constructed in accordance with a further embodiment of the invention.

A further modification of the present invention is illustrated in FIG. 9 of the drawings. In describing the screen with reference to FIGS. 2 and 3 of the drawings, the screen body 16 has been described as including ribs 20 and 22 which serve to isolate the discrete areas of the screen. While this ribd structure is of importance as it provides a simple support structure for supporting and isolating the individual bodies 26 of translucent filler material, it should be understood that a structure consisting of substantially rigid ribs is not essential. FIG. 9 illustrates an alternative construction in which the individual blocks 26 are isolated from one another by thin foils 20a and 22a which may be in the form of aluminum foil or the like. It will be apparent that the foils 20a and 22a do not add any significant structural strength to the element but are, however, sufficient to prevent light transmission from one adjacent block to the other and thereby serve to isolate discrete areas of a screen from one another. FIG. 9 of the drawings also serves to illustrate a further embodiment of the invention in which each block or body 26 consists of a body of wax 26a which has a plastic cap 26b on its viewing face. Preferably, the viewing face 14a of the body of wax 26a has a convex curvature. It has been found that by the use of a convex curvature on the viewing face of the body of wax, it is possible to minimize the thickness of the body of wax without any significant loss in the uniformity of light and density across each individual block. The plastic cap 26b, which may be cast in situ, serves as a protective covering for the viewing face. The caps 26b also serve to form a flat face at the viewing face of the screen which is of advantage in the printing system described with reference to FIG. 5. The cap 26b is preferably made from a transparent polyester resin material. It has been found that the natural shrinkage of the wax cast into a confined area, such as the passages of the screen grid described in FIG. 2, provides a convex curvature at the upper surface which has the advantages described above. Thus, rather than removing the convex curvature in order to form a flat face on the screen, it has been found that it is preferable to retain this convex curvature and to achieve the flat surface on the screen either by capping or by permitting the side walls of the screen to project above the convex curvature of each individual block. Consequently while FIG. 3 of the drawings shows an embodiment in which the blocks 26 are flat at the viewing face, in an alternative construction the viewing face of each block may be recessed and may have the natural convex upper surface obtained from shrinkage of paraffin wax.

Figure 5:
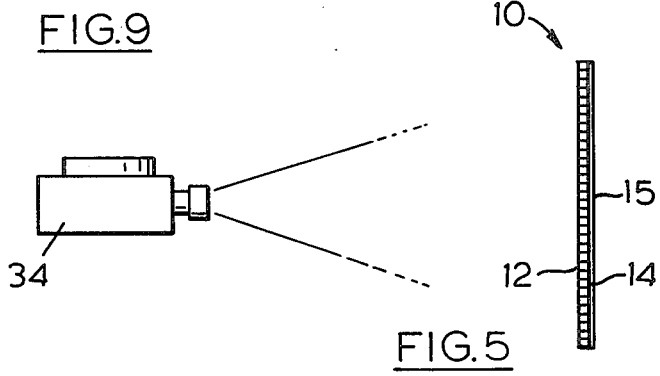
FIG. 5 is a side view of an alternative form of imaging system.

A further embodiment of the present invention is illustrated in FIG. 5 of the drawings in which reference numeral 34 refers generally to a projector in the form of a photographic enlarger which serves to project an image from a negative located therein onto the projection face 12 of the screen 10. A sheet of photographic paper 15 is positioned at the viewing face 14 of the screen so as to be exposed to the image projected through the screen so that a photograph may be printed onto the photographic paper 15 by the technique commonly known as contact printing.

Figure 10:
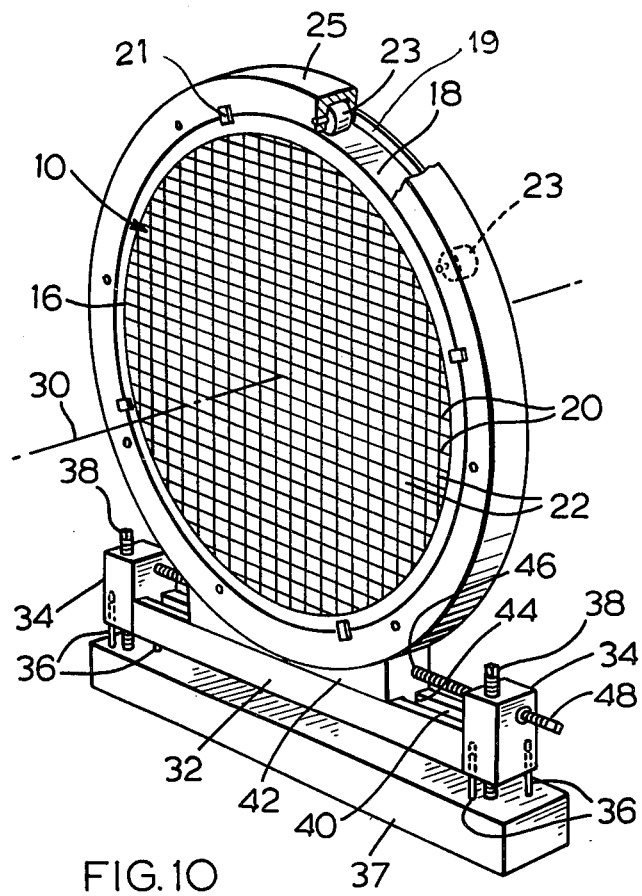
FIG. 10 is a pictorial view of a screen supported for rotational, vertical and lateral movement.

A further modification of the present invention is illustrated in FIG. 10 of the drawings wherein it will be seen that the screen 10 has a circular body portion 16 mounted within a circular frame 18 which is in turn supported by rollers 23 which are mounted for rotation in a support ring 25. The body 16 may be rotated about the axis 30 by manually engaging it and rotating it relative to the outer ring 25. Thus, the angular position of the opaque barriers 20 and 22 may be adjusted relative to the projected image merely by rotating the body 16 relative to the support ring 25 about the axis 30. The frame 18 is retained against axial movement by an annular lip 19 and by small keeper plates 21 which are mounted on the frame 18 and which slidably engage opposite sides of the ring 25.

The support mechanism also includes a guide plate 32 which has support brackets 34 at opposite ends thereof which are mounted to slide vertically on guide pins 36 which project upwardly from the base plate 37. A jacking screw 38 is threadably mounted in each support bracket 34 and is adjustable so as to raise and lower the guide plate 32. The guide plate 32 has an elongated channel 40 extending longitudinally of the upper surface thereof. A slide member 42 is rigidly secured to the support ring 25. The slide member 42 has a tongue 44 adapted to fit in a free fitting sliding relationship within the slot 40. The tongue 44 serves to support the slide member against free rotation relative to the base plate 32. The slide member 42 also has a threaded passage 46 extending therethrough. A threaded adjustment screw 48 extends through the threaded passage 46 and is mounted for rotation relative to the end plates 34 whereby rotation of the shaft 48 will effect lateral movement of the slide 42 with respect to the base 32 and thus effect lateral movement of the body 16 with respect to a projected image such that the opaque barriers 20 and 22 may be adjusted both vertically and laterally with respect to a stationary projected image. This adjustment mechanism provides a fine adjustment of the screen with respect to a projected image which can be used to vary the appearance of the viewed image. It should be noted that the adjustment in any direction need only be about half of the maximum distance between opaque barriers.

Various other techniques for utilizing the screen in association with various projectors and receivers will be apparent to those skilled in the art. The screen might conveniently be located directly in front of the screen of a television set or the like, in which case the television set acts as a projector. In another alternative construction, a negative may be placed directly on the projection face of the screen.

These and other advantages of the present invention will be apparent to those skilled in the art.

What I claim as my invention is:

1. A screen for use in a rear projection system, comprising a body having a projection face and a viewing face, said body comprising a plurality of blocks of translucent wax arranged in a side-by-side relationship and opaque barrier means disposed between adjacent sides of each block and extending between the projection face and the viewing face of the screen to prevent light transmission from one block to another through the sides of each block.

2. A screen as claimed in claim 1 wherein the projection face of each block has a shallow convex curvature.

3. A screen as claimed in claim 2 wherein the projection face of each block is capped with a cap of clear transparent material which has a flat outer face.

4. A screen for use in a rear projection system comprising:
   (a) a screen body having a projection face and a viewing face, a plurality of passages opening through said body for transmitting light from said projection face to said viewing face, said passages having opaque side walls for preventing light transmission from one passage to another through said side walls,
   (b) a body of substantially homogeneous translucent wax in each of said passages, said wax serving to uniformly disperse light transmitted therethrough such that light directed into each passage at the projection face of the screen and having a variable intensity across the width of each passage will be visible at the viewing face of each passage having uniform light intensity, and wherein by reason of the opaque side walls sharp contrast in light intensity between adjacent passages may be visible at said viewing face.

5. A screen as claimed in claim 4 wherein said screen body comprises a plurality of ribs which intersect one another to separate said passages from one another.

6. A screen as claimed in claim 4 wherein the thickness of the body of filler material between said projection face and said viewing face is at least 1.25 times the maximum width of its associated passage.

7. An imaging system comprising:
   (a) a rear projection screen having a projection face and a viewing face, opaque divider means extending across the screen dividing it into a plurality of isolated light transmitting passages extending between the projection face and the viewing face, a body of translucent wax in each of said passages for integrating the light passing therethrough from the projection face to the viewing face so as to provide uniform light intensity across the width of individual passages at said viewing face,
   (b) projector means adapted to project a progressively varying image onto said projection face so as to progressively vary the resolution of the image viewed at the viewing face of the screen.

8. An imaging system as claimed in claim 7 wherein the projector means is adapted to progressively vary the number of passages against which an image is projected so that the resolution of the image observed at the viewing face improves progressively with the increase in the number of passages illuminated by the image.

9. An imaging system as claimed in claim 7 or 8 including means for photographing the images which are viewable on the viewing face of the screen.

10. An imaging system is claimed in claim 9 wherein the means for photographing the images is adjustable so that the images which it photographs fill the same area of each frame of the film located therein.

11. A method of preparing a series of photographic images of varying resolution comprising the steps of:
   (a) projecting an image onto a projection face of a rear projection screen comprising a plurality of blocks of translucent wax arranged in a side-by-side relationship and opaque barrier means disposed between adjacent sides of each block to prevent light transmission from one block to another through the sides of each block, the projected image being visible at a viewing face of the screen disposed opposite the projection face,
   (b) photographing the images appearing on the viewing face of the screen.

12. A method of forming an image as claimed in claim 11 wherein a first image is repeatedly projected onto said screen so as to progressively extend to cover an increasing number of discrete areas of the screen whereby the resolution of the image visible on the viewing face of the screen progressively increases.

13. A method of forming an image as claimed in claim 11 wherein a first image is repeatedly projected onto said screen so as to progressively extend to cover a decreasing number of discrete areas of the screen whereby the resolution of the image visible on the viewing face of the screen progressively decreases.

14. A method as claimed in claim 11 wherein the images appearing on the viewing screen are photographed at a progressively varying range corresponding to the progressive variations in area covered by the projected image whereby the proportion of the frame of the film which is filled by each photograph remains substantially constant.

15. A method as claimed in claim 11 wherein the photographic images are formed on a light sensitive paper disposed in a face-to-face relationship with the viewing surface of the 16. A screen as claimed in claim 1 having an axis of rotation extending normal to said viewing face, support means supporting said screen for rotation about said axis to permit angular adjustment of said opaque barrier means.

17. A screen as claimed in claim 1 including support means for supporting said body for lateral movement in a plane parallel to the plane of said viewing face.

18. A screen as claimed in claim 16 wherein said support means support said screen for vertical movement in the plane of said viewing face.

19. A screen as claimed in claim 1 including support means supporting said body for movement about an axis of rotation extending perpendicularly through the viewing face and for lateral and vertical movement in a plane parallel to the plane of the viewing face whereby adjustment in the appearance of the image on the viewing face may be achieved without any adjustment of the projected image by moving the body to move the opaque barriers relative to the image by moving said body with respect to said support means.

* * * * *